US010395031B2

(12) United States Patent
Shyamsunder et al.

(10) Patent No.: US 10,395,031 B2
(45) Date of Patent: Aug. 27, 2019

(54) SYSTEMS AND METHODS FOR MALWARE DETECTION AND SCANNING

(75) Inventors: Karthik Shyamsunder, Winchester, VA (US); Trevor Tonn, Sunnyvale, CA (US); Ralph Thomas, Fredericksburg, VA (US); Alexander Holmes, Sterling, VA (US); James Krahulec, Fairfax, VA (US); Srinivas Sunkara, Ashburn, VA (US)

(73) Assignee: VERISIGN, INC., Reston, VA (US)

( * ) Notice: Subject to any disclaimer, the term of this patent is extended or adjusted under 35 U.S.C. 154(b) by 428 days.

(21) Appl. No.: 12/982,540

(22) Filed: Dec. 30, 2010

(65) Prior Publication Data

US 2012/0174225 A1 Jul. 5, 2012

(51) Int. Cl.
*G06F 21/56* (2013.01)
*H04L 29/06* (2006.01)

(52) U.S. Cl.
CPC ............ *G06F 21/566* (2013.01); *G06F 21/56* (2013.01); *H04L 63/145* (2013.01); *H04L 63/1491* (2013.01); *H04L 63/14* (2013.01); *H04L 63/1433* (2013.01)

(58) Field of Classification Search
CPC ... H04L 63/14; H04L 63/302; H04L 63/1433; H04L 63/1416; H04L 63/1441; H04L 63/145; H04L 63/1491; G06F 21/566; G06F 21/53; G06F 21/56; G06F 21/562; G06F 21/564; G06F 21/567; G06F 2221/2119
USPC ...................................... 726/24, 22; 713/188
See application file for complete search history.

(56) References Cited

U.S. PATENT DOCUMENTS

| | | | | |
|---|---|---|---|---|
| 6,182,227 B1* | 1/2001 | Blair et al. | | 726/5 |
| 7,519,982 B1* | 4/2009 | Gordon et al. | | 725/54 |
| 7,536,452 B1* | 5/2009 | Cao | | H04L 45/00 709/223 |
| 7,599,920 B1* | 10/2009 | Fox et al. | | |
| 7,836,502 B1* | 11/2010 | Zhao et al. | | 726/22 |
| 8,244,799 B1* | 8/2012 | Salusky | | H04L 63/126 709/201 |
| 8,286,239 B1* | 10/2012 | Sutton | | H04L 63/0227 726/22 |
| 9,002,777 B1* | 4/2015 | Muddu | | G06Q 10/00 707/694 |
| 2002/0129277 A1* | 9/2002 | Caccavale | | 713/201 |

(Continued)

OTHER PUBLICATIONS

International Search Report and Written Opinion dated Apr. 5, 2012, in International Application No. PCT/US2011/067357, (12 pages).

(Continued)

*Primary Examiner* — Theodore C Parsons
(74) *Attorney, Agent, or Firm* — Artegis Law Group, LLP

(57) ABSTRACT

Systems and methods are provided for malware scanning and detection. In one exemplary embodiment, the method includes a hub computing device that receives, from a controller computing device, a scan request, and identifies spoke computing devices for performing the scan request. The method performed by the hub computing device also includes sending to the identified spoke computing devices, the scan request, receiving, from the spoke computing devices, results associated with the scan request, and sending, to the controller computing device, the results associated with the scan request.

24 Claims, 6 Drawing Sheets

(56) References Cited

U.S. PATENT DOCUMENTS

| | | | |
|---|---|---|---|
| 2003/0051154 A1* | 3/2003 | Barton | G06F 21/562 726/4 |
| 2004/0044962 A1* | 3/2004 | Green | G06F 17/30864 715/234 |
| 2005/0283833 A1* | 12/2005 | Lalonde et al. | 726/22 |
| 2006/0136374 A1* | 6/2006 | Shelest et al. | 707/3 |
| 2006/0174345 A1 | 8/2006 | Flanagan et al. | |
| 2006/0253458 A1 | 11/2006 | Dixon et al. | |
| 2007/0074169 A1 | 3/2007 | Chess et al. | |
| 2007/0174915 A1 | 7/2007 | Gribble et al. | |
| 2007/0208822 A1* | 9/2007 | Wang | H04L 63/1416 709/217 |
| 2007/0277237 A1 | 11/2007 | Adelman et al. | |
| 2007/0299915 A1* | 12/2007 | Shraim | G06Q 10/107 709/206 |
| 2008/0133540 A1* | 6/2008 | Hubbard et al. | 707/10 |
| 2008/0183889 A1* | 7/2008 | Andreev | H04L 29/06 709/238 |
| 2008/0301051 A1 | 12/2008 | Stahlberg | |
| 2008/0301281 A1* | 12/2008 | Wang et al. | 709/224 |
| 2008/0320595 A1 | 12/2008 | van der Made | |
| 2009/0070873 A1 | 3/2009 | McAfee et al. | |
| 2010/0020700 A1* | 1/2010 | Kailash | H04L 12/2602 370/242 |
| 2010/0031353 A1 | 2/2010 | Thomas et al. | |
| 2010/0186088 A1 | 7/2010 | Banerjee et al. | |
| 2011/0072514 A1* | 3/2011 | Gilder et al. | 726/22 |
| 2011/0197272 A1 | 8/2011 | Mony | |
| 2011/0219454 A1* | 9/2011 | Lee et al. | 726/25 |
| 2012/0174224 A1 | 7/2012 | Thomas et al. | |
| 2016/0337380 A1* | 11/2016 | Thomas | G06F 21/566 |

OTHER PUBLICATIONS

Ali Ikinici, "Monkey-Spider: Detecting Malicious Web Sites," http://monkeyspider.sourceforge.net/Diploma-Thesis-Ali-Ikinci.pdf, May 23, 2007, (88 pages).

Radek Hes et al., "The Capture—HPC Client Architecture," http://ecs.victoria.ac.nz/twiki/pub/Main/TechnicalReportSeries/ECSTR09-11.pdf, Oct. 31, 2010, (8 pages).

"Client honeypot," http://en.wikipedia.org/w/index.php?title=Client_honeypot&oldid=371196519, Jul. 1, 2010, (6 pages).

"Snort (software)," http://en.wikipedia.org/w/index.php?title=Snort_%28software%29&oldid=401501779, Dec. 9, 2010, (2 pages).

International Search Report and Written Opinion dated Apr. 5, 2012, in International Application No. PCT/US2011/067358, (13 pages).

Christian Seifert, "Know Your Enemy: Malicious Web Servers," http://www.net-security.org/dl/articles/KYE-MaliciousWebServers.pdf, Aug. 9, 2007 (25 pages).

Xiaoyan Sun et al., "Collecting Internet Malware Based on Client-side Honeypot," Young Computer Scientists, ICYCS, The 9th International Conference for IEEE, Nov. 18, 2008 (6 pages).

Lin et al., "Anti-malicious Injection Based on Meta-programs," Dept. of Computer Science and Engineering, Tatung University, Taiwan, Jan. 10, 2008 (retrieved from http://www.joc.iecs.fcu.edu.tw/Published%20Vol_19_No_1.files/JOC_SE8_2.pdf) (10 pages).

Rathgeber et al., "An Intention-based Malware Attack Prevention System," White Paper, Ikona Software, Inc., Aug. 2009 (retrieved from http://www.ikonasoftware.com.my/ikonak/images/stories/ikonak/pdf/whitepaper.pdf) (9 pages).

Wang et al., "Automated Web Patrol with Strider HoneyMonkeys: Finding Web Sites that Exploit Browser Vulnerabilities," Microsoft Research, 2006 (retrieved from http://citeseerx.ist.psu.edu/viewdoc/summary?doi=10.1.1.100.224) (15 pages).

Websense, "The Websense ThreatSeeker Network: Leveraging Websense HoneyGrid Computing," Websense Inc., 2008 (retrieved from http://www.websense.com/assets/White-Papers/WP_HoneyGrid_Computing.pdf) (14 pages).

Sucuri, "Protecting Your Interwebs: About Sucuri Security," Sucuri, 2010 (retrieved from http://sucuri.net/about) (2 pages).

Dasient, "Web Anti-Malware Solution, Malware monitoring, Malware Scanning: Dasient Solution," Dasient, Inc., 2010 (retrieved from http://wam.dasient.com/wam/whydasient_solution) (2 pages).

Non-Final Office Action dated Mar. 14, 2013, U.S. Appl. No. 12/982,508, filed Dec. 30, 2010, pp. 1-22.

* cited by examiner

SYSTEMS AND METHODS FOR MALWARE DETECTION AND SCANNING

RELATED APPLICATIONS

This application is related to U.S. patent application Ser. No. 12/982,508, filed Dec. 30, 2010, entitled "SYSTEMS AND METHODS FOR MALWARE DETECTION AND SCANNING," the entire contents of which is incorporated herein by reference in its entirety.

TECHNICAL FIELD

The present disclosure generally relates to systems and methods for improved malware detection and scanning and, more particularly, to systems and methods for improved scalable malware detection and scanning using virtual machines.

BACKGROUND

The growth of computer networking has brought with it an explosion in the number of malicious software attacks, commonly referred to as malware attacks. These malware attacks may include viruses, worms, trojan horses, spyware, rootkits, denial of service attacks (DDOS), and other malicious programs. Malware is often installed on computers running browsers while communicating with malicious web sites that exploit browser vulnerabilities. That is, flaws either in the browser or automatically launched external programs and extensions can allow a malicious web page to install malware automatically when a user visits the malicious web page, such that the user may not be aware of the installation.

Often multiple malware exploits or tasks are implemented in tandem, causing a computer to download, store, and then execute a malware executable, also referred to as a binary module. In many cases, a successful exploit results in the automatic installation of a malware binary module, often called a "drive-by download." The installed malware may enable a malware attacker to gain remote control over the compromised computer system and, in some cases, enable the malware attacker to steal sensitive information, send out spam, or install more malicious executable modules over time.

Malware propagation wastes valuable resources, such as system user time, system administrator resources, network bandwidth, disk space, and CPU cycles. Malware can also corrupt data files such that the originals may not be recoverable. Additionally, malware can cause the compromised computer to transmit confidential data (e.g., banking information, passwords, etc.) to the malware attacker.

The disclosed embodiments address one or more of the problems set forth above.

SUMMARY

In one exemplary embodiment, the present disclosure is directed to a method for malware scanning and detection in a hub computing device, the method comprising: receiving, from a controller computing device, a scan request; identifying, by the hub computing device, one or more spoke computing devices for performing the scan request; sending, by the hub computing device, to the identified spoke computing devices, the scan request; receiving, from the spoke computing devices, results associated with the scan request; and sending, to the controller computing device, the results associated with the scan request.

In another exemplary embodiment, the present disclosure is directed to a hub computing apparatus for malware scanning and detection, the apparatus comprising: at least one memory to store data and instructions; and at least one processor configured to access the at least one memory and, when executing the instructions, to: receive, from a controller computing device, a scan request; identify spoke computing devices for performing the scan request; send, to the identified spoke computing devices, the scan request; receive, from the one or more spoke computing devices, results associated with the scan request; and send, to the controller computing device, the results associated with the scan request.

In another exemplary embodiment, the present disclosure is directed to a method for malware scanning and detection in a spoke computing device, the method comprising: receiving, from a hub computing device, a scan request; performing, by the spoke computing device, analysis according to the received scan request; storing, in a database of the spoke computing device, results of the analysis; and sending, to the hub computing device, the results of the analysis.

In another exemplary embodiment, the present disclosure is directed to a spoke computing apparatus for malware scanning and detection, the apparatus comprising: at least one memory to store data and instructions; and at least one processor configured to access the at least one memory and, when executing the instructions, to: receive, from a hub computing device, a scan request; perform analysis according to the received scan request; store, in a database of the spoke computing apparatus, results of the analysis; and send, to the hub computing device, the results of the analysis.

BRIEF DESCRIPTION OF THE DRAWINGS

The accompanying drawings, which are incorporated in and constitute a part of this disclosure, illustrate aspects consistent with the present disclosure and, together with the description, serve to explain advantages and principles of the present disclosure. In the drawings.

DETAILED DESCRIPTION

Figure 1:
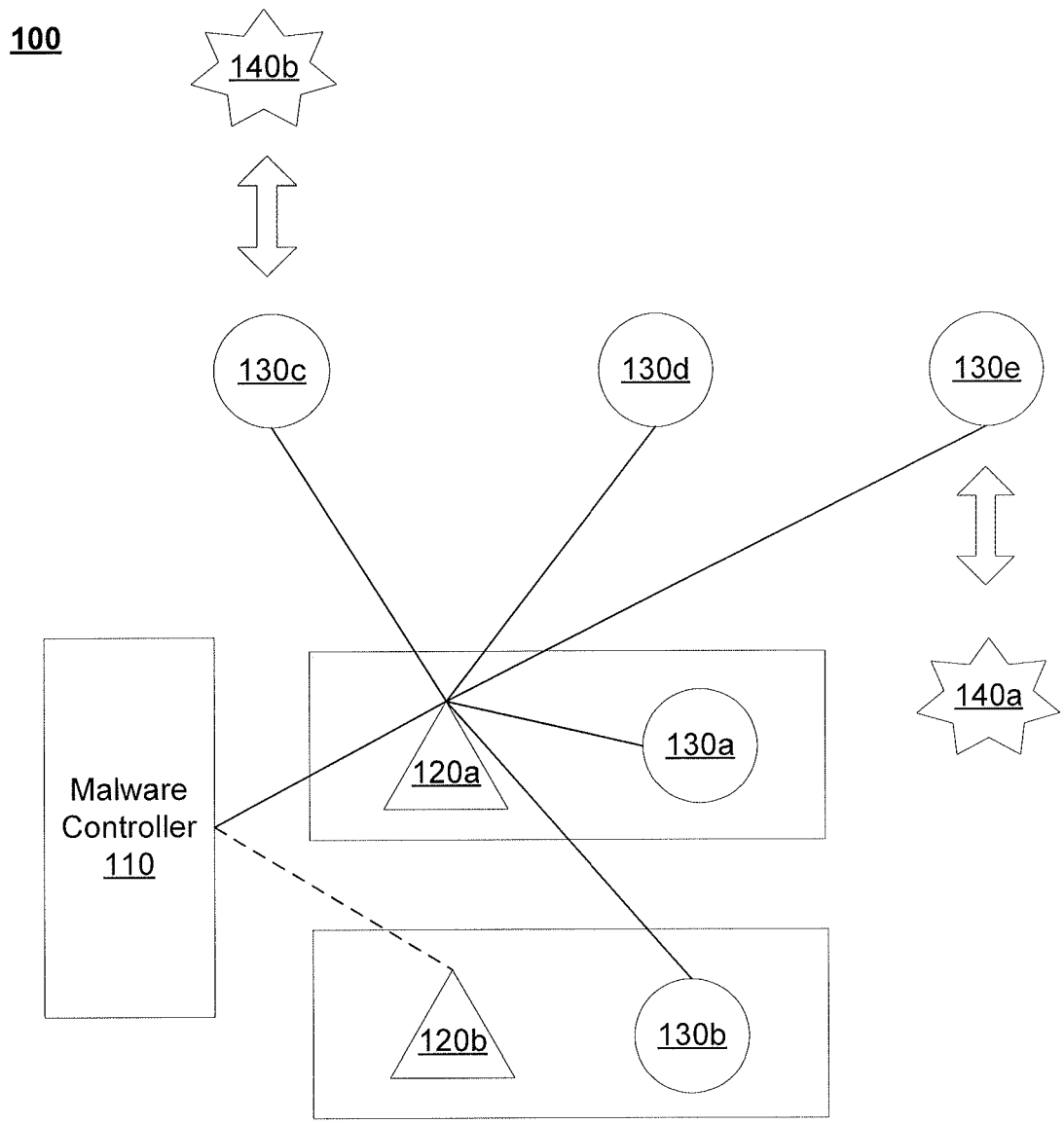
FIG. 1 illustrates an exemplary scalable hub-and-spoke system, consistent with certain disclosed embodiments.

Web servers attempting to infect computing devices with malware often attempt to infect a client user only once in order to limit the ability of computing devices to preemptively detect and prevent malware infections. Typically, clients are identified by their Internet Protocol (IP) address. Thus, it is useful to perform malware detection and analysis using a diversity of IP addresses. IP address diversification can be achieved using computing devices physically located at an IP address, e.g., a "blade" seated in a routing device, as well as through the use of proxies. IP diversification can also be achieved by changing IP addresses within a netblock (or, more generally, a "/24" block) of IP addresses (i.e., the last 8 bits of an IP address).

Honeypots are one tool that may be used to preemptively detect and prevent malware infections. Generally, a honeypot is a computing device configured to detect and/or analyze attempts at unauthorized use of computing systems. In some embodiments, a honeypot is designed to be exploited in as many ways possible and to "fool" malicious webservers into thinking the honeypot is a real user visiting a web page. By seeking to be exploited as often as possible, honepots allow malicious web pages to be identified and campaigns that span plural web pages across plural domains to be tracked. Typically, a honeypot is configured to operate with an internet browser and/or operating system known to be vulnerable to malware attacks or have software flaws. Using a combination of diversified IP addresses and honeypots, malware detection can be performed more effectively.

It is to be understood that both the foregoing general description and the following detailed description are exemplary and explanatory only and are not restrictive of the disclosure, as claimed.

The following detailed description refers to the accompanying drawings. Wherever possible, the same reference numbers will be used throughout the drawings and the following description to refer to the same or like parts. While several exemplary embodiments and features are described herein, modifications, adaptations and other implementations are possible, without departing from the spirit and scope of the disclosure. For example, substitutions, additions or modifications may be made to the components illustrated in the drawings, and the exemplary methods described herein may be modified by substituting, reordering or adding steps to the disclosed methods. Accordingly, the following detailed description does not limit the disclosure.

FIG. 1 is a diagram of an example scalable hub-and-spoke system 100 in which systems and methods consistent with the present disclosure may be implemented. Specifically, FIG. 1 illustrates an example scalable hub-and-spoke system 100 that allows distributed processing across multiple computing devices. In FIG. 1, scalable hub-and-spoke system 100 includes a malware controller 110, one or more hubs 120 (e.g., hub 120a and hub 120b), one or more "thick spokes" 130 (e.g., thick spoke 130a, thick spoke 130b, thick spoke 130c, thick spoke 130d, and thick spoke 130e), and one or more "thin spokes" (e.g., thin spoke 140a and thin spoke 140b). As used herein, a thick spoke may be an autonomous computing device configured to perform honeypot functions, malware analysis, and "crawl" functions, and a thin spoke may be a computing device functioning as a proxy of a thick spoke to aid in IP diversification.

Although not shown, each of malware controller 110, hubs 120, thick spokes 130, and thin spokes 140 may communicate with one another via a network, such as, for example, the Internet, an intranet, a Wide Area Network (WAN), a Local Area Network (LAN), etc. The network may be wired, wireless, or any combination thereof.

As shown in FIG. 1, malware controller 110 may be any type of computing device, many of which are known in the art. Malware controller 110 may be configured to receive malware scan requests from a client, and send the malware scan requests to one or more hubs 120 for further processing. Malware controller 110 may be configured to analyze data to automatically and autonomously identify malware scan requests, and send the malware scan requests to one or more hubs 120 for further processing. Malware scan requests may include one or more parameters, such as, for example, target uniform resource identifiers (URIs), uniform resource locators (URLs), and/or uniform resource names (URNs); types and/or number of browsers to use when visiting the targeted URIs, URLs, and/or URNs; a priority of the malware scan request; how many links (e.g., hypertext links) to extract from the targeted URIs, URLs, and/or URNs and visit; number of pages of the targeted URIs, URLs, and/or URNs to visit, specific hostnames for which links can be extracted from the targeted URIs, URLs, and/or URNs and visited; rate-limiting parameters; etc.

As illustrated by FIG. 1, malware controller 110 may be in communication with hub 120a. In addition, malware controller 110 may also be communicatively coupled to hub 120b, as illustrated by the dashed line from malware controller 110 to hub 120b. That is, malware controller 110 may be configured to send instructions, including malware scan requests, and data to hub 120a, and receive data, including results of malware scan requests, from hub 120a. However, in the event that hub 120a should become inoperable or there is a loss of communication between malware controller 110 and hub 120a, malware controller 110 may also communicate with hub 120b, and be configured to immediately begin sending instructions and data to hub 120b, and begin receiving data from hub 120b. In such an embodiment, hub 120b may be considered to be a backup hub that is on "hot standby." Although malware controller 110 is illustrated in FIG. 1 as connected only to hubs 120a and 120b, malware controller 110 may be connected to and/or in communication with a greater or fewer number of hubs 120.

Figure 2:
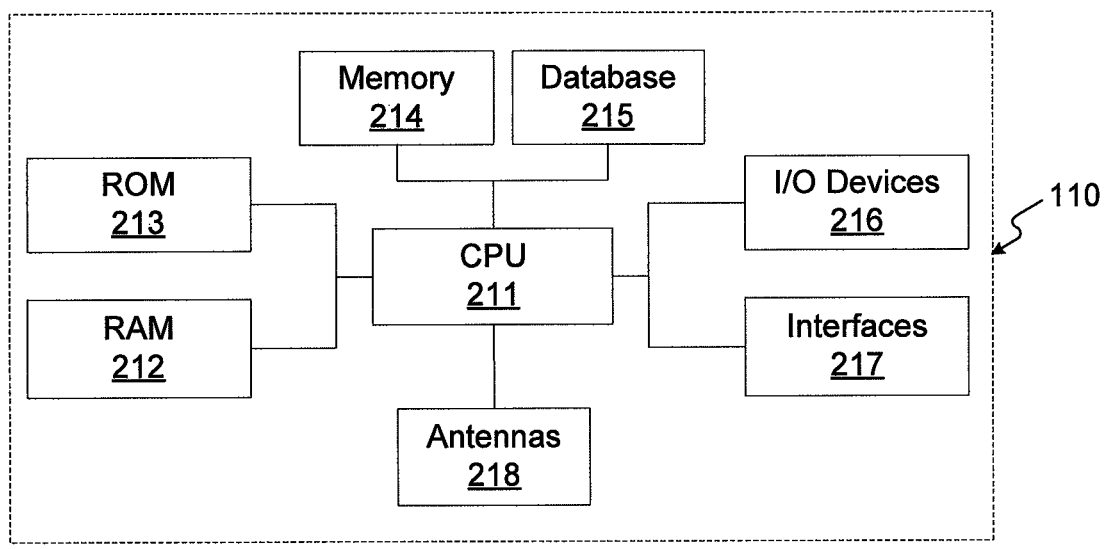
FIG. 2 illustrates an example malware controller in an exemplary scalable hub-and-spoke system, consistent with certain disclosed embodiments.

FIG. 2 is a diagram of an exemplary malware controller 110, consistent with certain disclosed embodiments. As shown in FIG. 2, malware controller 110 may include one or more of the following components: a central processing unit (CPU) 211 configured to execute computer program instructions to perform various processes and methods; random access memory (RAM) 212 and read only memory (ROM) 213 configured to access and store information and computer program instructions; memory 214 to store data and information; databases 215 to store tables, lists, or other data structures; I/O devices 216; interfaces 217; antennas 218; etc. Each of these components is well-known in the art and will not be discussed further.

Hub 120 may be a computing device configured to perform data management, load management, and work delegation to one or more thick spokes 130. As illustrated in FIG. 1, hub 120a may be in communication with one or more thick spokes 130, including thick spoke 130a, thick spoke 130b, thick spoke 130c, thick spoke 130d, and thick spoke 130e. Thus, hub 120a, the active hub 120 in the example of FIG. 1, may be configured to perform load management for thick spokes 130a, 130b, 130c, 130d, and 130e, and delegate malware scan requests received from malware controller 110 to one or more thick spokes 130a, 130b, 130c, 130d, and 130e based on load management determinations. Although hub 120a is illustrated in FIG. 1 as connected only to thick spokes 130a, 130b, 130c, 130d, and 130e, hub 120 may be connected to and/or in communication with a greater or fewer number of thick spokes 130 such that the number of thick spokes 130 may be scalable in both an increasing and decreasing manner.

Figure 3A:
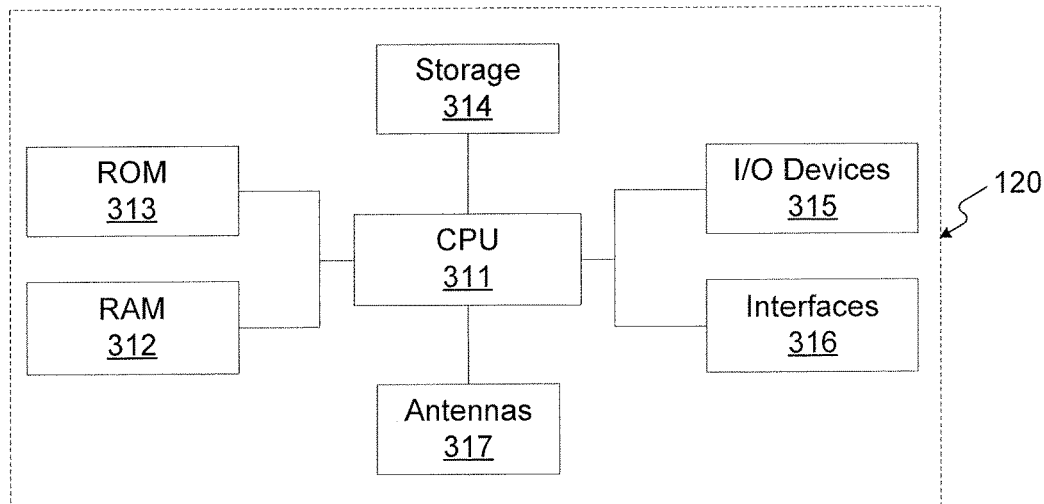
FIG. 3a illustrates an example hub in an exemplary scalable hub-and-spoke system, consistent with certain disclosed embodiments.

FIG. 3*a* is a diagram of an exemplary hub 120, consistent with certain disclosed embodiments. As shown in FIG. 3*a*, hub 120 may include one or more of the following components: a central processing unit (CPU) 311 configured to execute computer program instructions to perform various processes and methods; random access memory (RAM) 312 and read only memory (ROM) 313 configured to access and store information and computer program instructions; storage 314 to store information, tables, lists, or other data structures; I/O devices 315; interfaces 316; antennas 317; etc. Each of these components is well-known in the art and will not be discussed further.

Figure 3B:
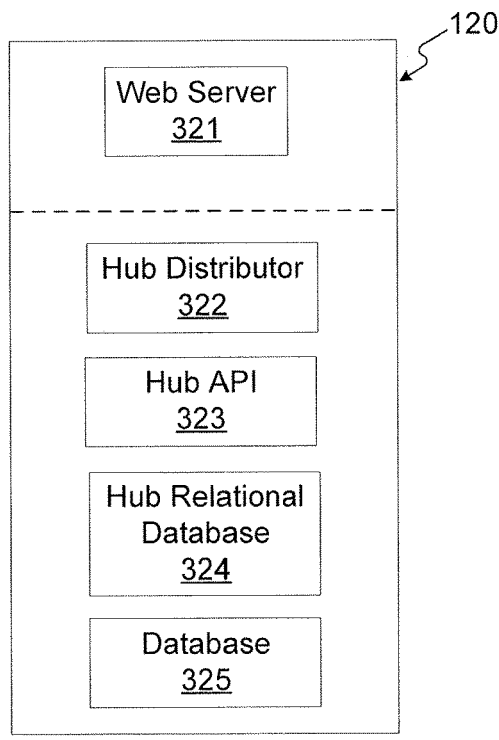
FIG. 3b illustrates an example of software components of the exemplary hub of FIG. 3a, consistent with certain disclosed embodiments.

FIG. 3*b* is a diagram illustrating an exemplary software architecture of hub 120, consistent with certain disclosed embodiments. As shown in FIG. 3*b*, the example software architecture of hub 120 may include a web server 321, a hub distributor 322, a hub application programming interface (API) 323, a relational database 324, and a database 325.

Web server 321 may be a software program configured to operate as a connection between malware controller 110 and hub 120, and between hub 120 and one or more thick spokes 130. Thus, web server 321 may be configured to send and receive messages, including data and instructions, between malware controller 110 and hub 120, as well as between hub 120 and one or more thick spokes 130. In one exemplary embodiment, web server 321 may be an Apache web server, which is an open-source HTTP/1.1-compliant web server.

Hub distributor 322 may be a software program configured to manage one or more thick spokes 130 and thin spokes 140. Hub distributor 322 may send malware scan requests to thick spokes 130, and perform associated load management and allocation of thick spokes 130 and thin spokes 140. In addition, hub distributor 322 may receive asynchronous responses from thick spoke 130, as well as manage thick spoke 130 status and network utilization.

Hub API 323 may be a software program configured to support malware scan requests received from malware controller 110. Hub API 323 may use, for example, JavaScript Object Notation (JSON), a lightweight text-based open standard designed for human-readable data interchange; Hypertext Transfer Protocol (HTTP), a networking protocol for distributed, collaborative, hypermedia information systems; or the like. In some embodiments, Hub API 323 may include two services used by hub 120 to interact with external systems, such as malware controller 110 and thick spokes 130. The first service may be configured to accept malware scan requests from malware controller 110, and the second service may be configured to accept requests from thick spokes 130 with status updates and scan responses. Hub API 323 may also include a response manager to initiate interaction with malware controller 110 in order to send scan responses received from thick spokes 130 to malware controller 110.

Hub relational database 324 may be a software database program configured to store data associated with hub 120, such as, for example MySQL. MySQL is a relational database management system (RDBMS) that may be configured to run as a server on hub 120, thereby providing multi-user access to a number of other databases, including database 325.

Database 325 may be a software database program configured to store data associated with hub 120. In one exemplary embodiment, database 325 may be a Hadoop database, also known as HBase. HBase is an open-source, distributed, versioned, column-oriented database that allows random, real-time read/write access to large amounts of data. In one exemplary embodiment, database 325 may contain all the link data uni-directionally transferred to hub 120 from thick spokes 130 and thin spokes 140.

Each of thick spokes 130 may be a computing device configured to perform malware scan requests sent by hub 120. For example, each of thick spokes 130 may be configured to perform honeypot functions, malware analysis, and "crawl" functions. In addition, thick spokes 130 may be configured use one or more thin spokes 140 as proxies to cause traffic appear to originate from a different source based on an IP address associated with thin spoke 140. In some embodiments, thick spokes 130 and thin spokes 140 may be within the same netblock of IP addresses. In other embodiments, thick spokes 130 and thin spokes 140 may be in different netblock of IP addresses. In still other embodiments, thick spokes 130 and thin spokes 140 may be geographically separated.

Figure 4A:
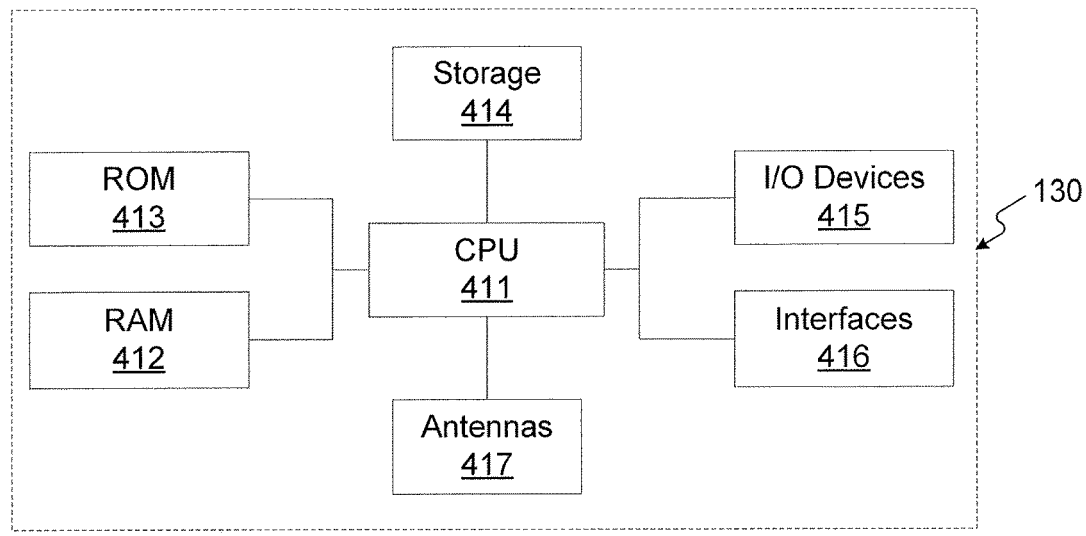
FIG. 4a illustrates an example thick spoke in an exemplary scalable hub-and-spoke system, consistent with certain disclosed embodiments.

FIG. 4*a* is a diagram of an exemplary thick spoke 130, consistent with certain disclosed embodiments. As shown in FIG. 4*a*, thick spoke 130 may include one or more of the following components: a central processing unit (CPU) 411 configured to execute computer program instructions to perform various processes and methods; random access memory (RAM) 412 and read only memory (ROM) 413 configured to access and store information and computer program instructions; storage 414 to store information, tables, lists, or other data structures; I/O devices 415; interfaces 416; antennas 417; etc. Each of these components is well-known in the art and will not be discussed further.

Figure 4B:
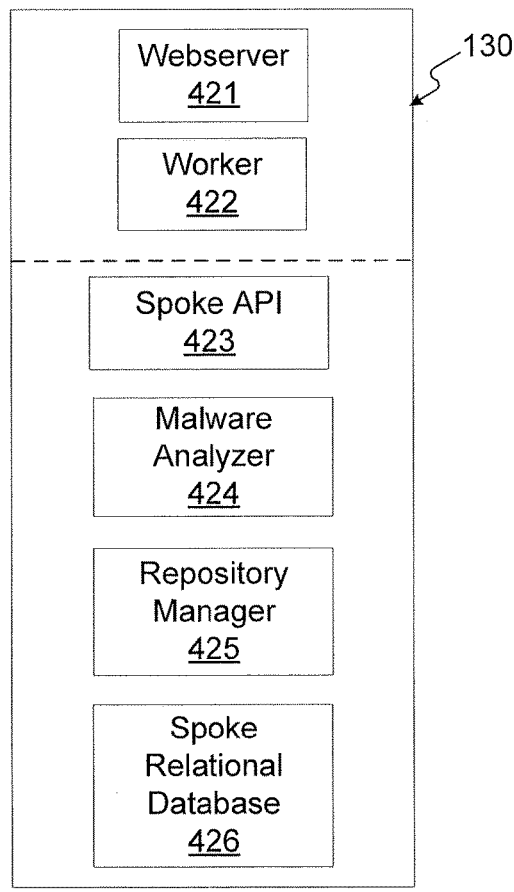
FIG. 4b illustrates an example of software components of the exemplary thick spoke of FIG. 4a, consistent with certain disclosed embodiments.

FIG. 4*b* is a diagram illustrating an exemplary software architecture of thick spoke 130, consistent with certain disclosed embodiments. As shown in FIG. 4*b*, thick spoke 130 may include web server 421, worker 422, spoke API 423, malware analyzer 424, repository manager 425, and spoke relational database 426.

Web server 421 may be a software program configured to serve as the connection between thick spoke 130 and hub 120, as well as between thick spoke 130 and thin spoke 140. Thus, web server 421 may be configured to send and receive messages, including data and instructions, between thick spoke 130 and hub 120, as well as between thick spoke 130 and thin spoke 140. In one exemplary embodiment, web server 421 may be an Apache web server.

Worker 422 may be a software program configured to perform honeypot management, initiate and manage one or more virtual machines (VMs) operating on thick spoke 130, launch one or more internet browsers in the one or more VMs, schedule execution of received malware scan requests, capture network packets, etc. Honeypot management may include management of honeypot software applications operating in the one or more VMs. VMs may be software implementations of a computer that execute programs like a physical computer. VMs may include system VMs that are configured to provide a system platform which supports the execution of a complete operating system (OS), or a process VM configured to run a single program or process, such as a browser. Internet browsers may include, for example, MICROSOFT INTERNET EXPLORER™, GOOGLE CHROME™, FIREFOX™, APPLE SAFARI™, etc. In the embodiments disclosed herein, the browsers operating in the VMs may function as web crawlers, systematically browsing the Internet (or World Wide Web) in a methodical, automated manner.

Worker 422 may also be configured to identify and extract rootkit data from the one or more VMs. Generally, a rootkit is software that enables privileged access to a computer while actively hiding its presence from administrators by subverting standard operating system functionality or other applications. Here, rootkit data is data associated with rootkit software installed on the one or more VMs by malicious websites.

In addition, worker 422 may be configured to instruct the honeypot to monitor API calls on the one or more VMs, such as the specific calls necessary to write files to disk and execute programs on the VM. The honeypot software may log the system API calls to a file, such as, for example, an Extensible Markup Language (XML) file. The file containing the system API calls may be sent to worker 422, and worker 422 may analyze the data included in the file. For example, using a system of tunable whitelists (i.e., lists of approved or registered APIs) and/or blacklists (i.e., lists of know bad APIs), malware analyzer 424 may be configured to ignore common API calls, while logging uncommon API calls that are often made by drive-by malware.

Spoke API 423 may be a software program configured to receive malware scan requests received from hub 120, and send the results of malware scan requests to hub 120. Spoke API 423 may also be configured to route malware scan requests through thin spokes 140. Spoke API 423 may use, for example, JSON, HTTP, or the like.

Malware analyzer 424 may include one or more software programs configured to perform behavioral and static analysis on data sent to and from the target URL using the captured network packets. For example, malware analyzer 424 may include one or more commercial and/or proprietary software programs to perform antivirus detection.

In addition, malware analyzer 424 may also include a JavaScript execution and emulation tool and a transmission control protocol (TCP) reassembly and Secure Socket Layer (SSL) decryption tool. The JavaScript execution and emulation tool, a dynamic analysis software tool, may process packet capture (pcap) files, collecting the TCP streams and extracting HTTP traffic. For example, the JavaScript execution and emulation tool may extract information from the transferred bytes to deobfuscate JavaScript using hooking techniques both in SpiderMonkey (the JavaScript engine), and JavaScript hooks. In doing so, the JavaScript execution and emulation tool may use rules to detect malicious content in both the original streams and in any of the decoded (or deobfuscated) information. The TCP reassembly and SSL decryption analysis may allow for SSL-protected Hypertext Transfer Protocol (HTTP) traffic to be transparently reconstructed into software objects. Software objects may include, for example, images, javascripts, flash movies, cascading style sheets, AJAX messages, etc. Malware analyzer 424 may also include tools for parsing, execution emulation, and static analysis of other web page content, such as, but not limited to, ADOBE™ FLASH™ (.swf) files, JAVA™ applets and programs (.jar), and MICROSOFT™ SILVERLIGHT™ data in a manner similar to that of the JavaScript execution and emulation tool. In some implementations, malware analyzer 424 may also include a system for reconstructing individual files and messages sent through the captured network packets.

Further, malware analyzer 424 may include a network intrusion detection system that may be configured to look at raw network traffic between systems, computing devices, and the like. For example, snort, a proprietary network intrusion detection system, may be used to identify obfuscated executable code in the raw network traffic or possible cross-site scripting attacks, as well as provide network protocol analysis for anomaly detection.

Repository manager 425 may include one or more software programs configured to download antivirus (AV) and malware blacklists from the Internet. The downloaded AV and malware blacklists may be commercial blacklists, proprietary blacklists, or any combination thereof. The AV and malware blacklists may serve as access controls by identifying entities that are denied entry to a specific list (or a defined range) of users, programs, or network addresses.

Spoke relational database 426 may be a software program configured to store data associated with thick spoke 130, such as, for example, MySQL. MySQL may be configured to run as a server on thick spoke 130.

Figure 5:
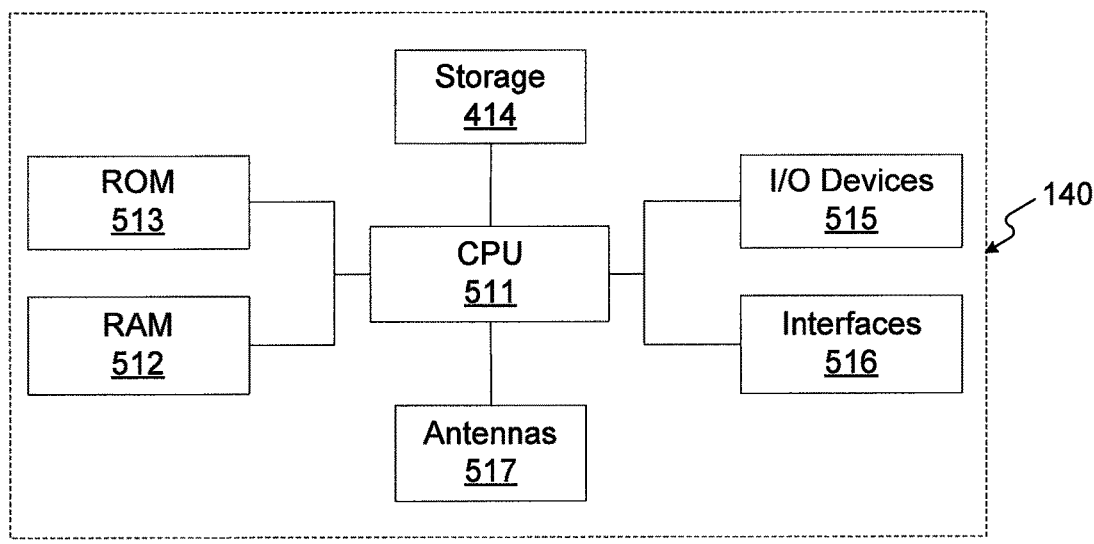
FIG. 5 illustrates an example thin spoke in an exemplary scalable hub-and-spoke system, consistent with certain disclosed embodiments.

FIG. 5 is a diagram of an exemplary thin spoke 140, consistent with certain disclosed embodiments. As shown in FIG. 5, each thin spoke 140 may include one or more of the following components: a central processing unit (CPU) 511 configured to execute computer program instructions to perform various processes and methods; random access memory (RAM) 512 and read only memory (ROM) 513 configured to access and store information and computer program instructions; storage 514 to store information, tables, lists, or other data structures; I/O devices 515; interfaces 516; antennas 517; etc. Each of these components is well-known in the art and will not be discussed further.

Figure 6:
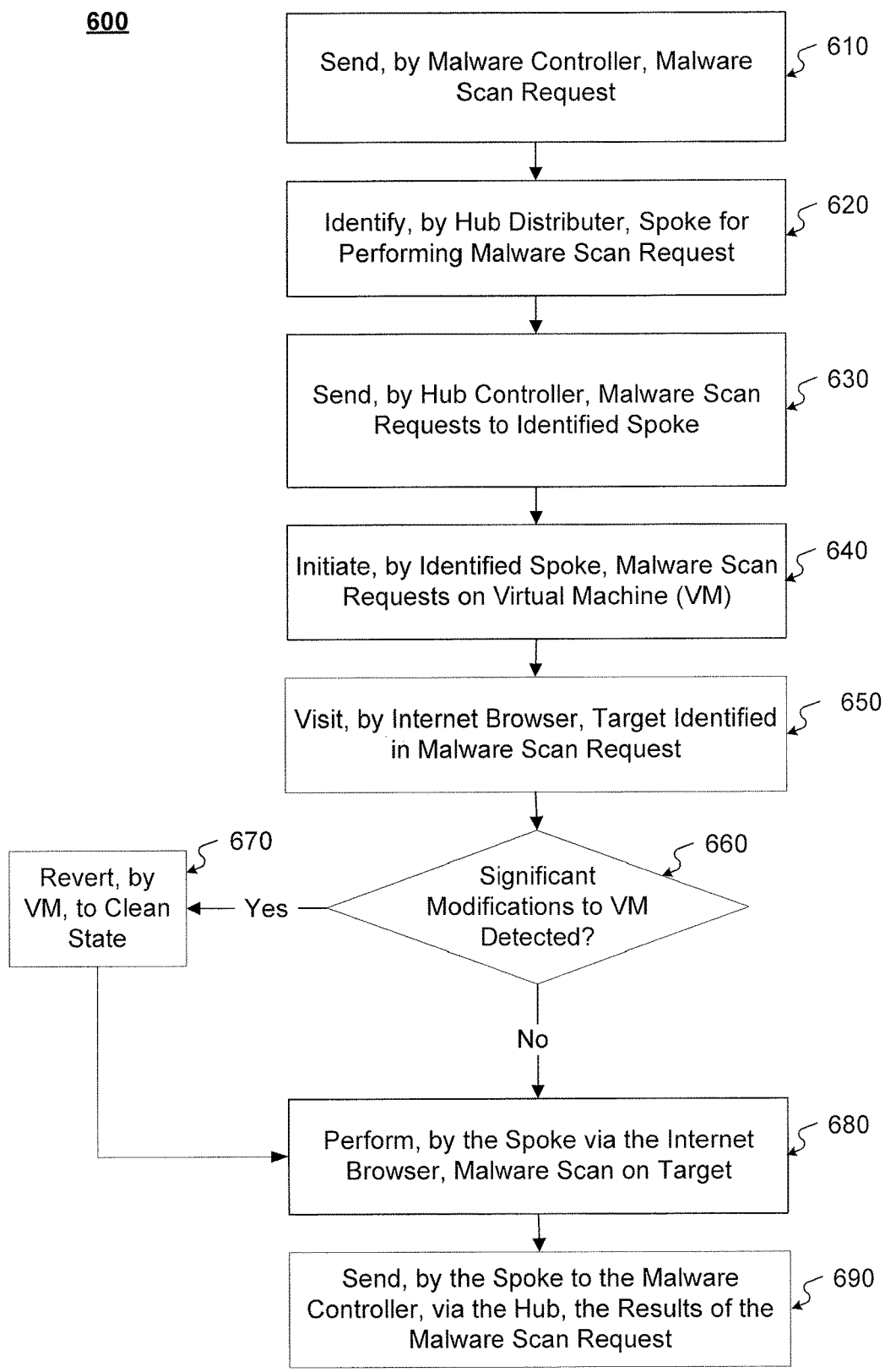
FIG. 6 is a flowchart illustrating a method for initiating a malware scan request in an exemplary scalable hub-and-spoke system, consistent with certain disclosed embodiments.

FIG. 6 is an example flowchart 600 illustrating initiation of a malware scan request in an exemplary scalable hub-and-spoke system, such as hub-and-spoke system 100, in accordance with certain implementations. Specifically, FIG. 6 illustrates a flowchart 600 consistent with example implementations of the present disclosure in which malware controller 110 sends a malware scan request to hub 120, such as hub 120a, which, in turn, distributes the malware scan request to thick spoke 130, such as thick spoke 130a.

As shown in FIG. 6, malware controller 110 may send a malware scan request to hub 120 (step 610). The malware scan request may include one or more target uniform resource identifiers (URIs), universal resource locators (URLs), and/or uniform resource numbers (URNs), as well as instructions, such as, for example, the identity of a desired operating system and/or internet browser for performing the malware scan request. The one or more target URIs, URLs, and/or URNs may be used to identify web pages and/or websites upon which malware scanning is to be performed. The malware scan request may be received by hub API 323, which may, in turn, send an acknowledgement message to malware controller 110. Hub API 323 may also store the received malware scan request in hub relational database 324.

Next, hub distributor 322 may identify one or more thick spokes 130 to perform the received malware scan requests (step 620). Hub distributor 322 may identify the one or more thick spokes 130 based on workload management and distribution criteria. Workload management and distribution criteria may include consideration of bandwidth utilization and costs, which may be affected by factors such as, for example, time of day, the number of IP addresses in a netblock, etc.

In addition, hub distributor 322 may identify the one or more thick spokes 130 based on rate-limiting concerns. Rate-limiting may be understood as limiting the number of concurrent honeypots visiting web pages within a domain and/or a netblock. Rate-limiting may be performed based on one or more parameters, and these one or more parameters may be independently configurable for each domain and/or netblock. The one or more parameters may include, for example, a number of honeypots that are permitted to concurrently visit a given domain and/or netblock. The number of honeypots may be set arbitrarily by a system manager and/or at the request of the domain owner and/or netblock owner. In one exemplary implementation, the number of honeypots may be set to avoid overloading relatively smaller webserver hosts while being able to effectively hasten the scanning speed for relatively larger webserver hosts. The determination of webserver host size (e.g., smaller, larger, etc.) may be defined manually, through an automated process of netblock lookups that are correlated to a table of known large hosts (such as GODADDY™, BLUEHOST™, etc.), or any combination thereof.

The one or more parameters may also include, for example, a time of day and/or a day of the week, such that the number of concurrent honeypots allowed to visit the same domain and/or netblock may be limited based on the time of day and/or the day of the week. For example, during times of the day and/or days of the week when the load presented on a domain and/or a netblock is at its highest, commonly referred to as "peak" hours, a fewer number of concurrent honeypots may be allowed to visit web pages belonging to these domains and/or netblocks. In some implementations, the remote webserver host load may be determined dynamically using metrics collected by thick spoke 130, and the number of concurrent honeypots that visit a domain and/or netblock may be controlled automatically. Such metrics may include, for example, delay in Transmission Control Protocol (TCP) handshake packets, increasing rate of remote webserver error response codes, etc.

Hub distributor 322 may retrieve one or more malware scan requests from database 325, and send the malware scan requests to one or more spoke APIs 423 associated with the identified one or more thick spokes 130 (step 630). The spoke API 423 may, in turn, store the received malware scan requests in spoke relational database 426, and send an acknowledgement message to hub 120. In some embodiments, if hub distributor 322 determines that the identified thick spoke 130 is unavailable, hub distributor 322 may be configured to identify another thick spoke 130, and reroute the malware scan requests to the newly identified thick spoke 130.

Worker 422 of thick spoke 130 may retrieve one or more malware scan requests from spoke relational database 426, and initiate the malware scan requests on one or more VMs operating on thick spoke 130 (step 640). The retrieved malware scan requests may be all of the malware scan requests stored in spoke relational database 426, or a subset of the malware scan requests stored in spoke relational database 426. In some embodiments, worker 422 may retrieve the one or more malware scan requests based on certain criteria. For example, worker 422 may retrieve the one or more malware scan requests from spoke relational database 426 based on an OS or a browser type included in the malware scan request. In this manner, worker 422 may retrieve one or more malware scan requests that correspond to the OS or browser type of the one or more VMs operating on thick spoke 130.

Worker 422 may provide a target URL in the malware scan request to a browser operating in the VM of thick spoke 130, and the browser may visit the target URL (step 650). Visiting a target URL may include navigating to the target URL and/or retrieving information or data contained on a web page of the target URL.

If, upon visiting the target URL, significant modifications to the VM are not detected (step 660, No), malware scan of the target may be performed (step 680). For example, thick spoke 130 may begin packet capture, and may initiate behavioral analysis using a behavioral logging system. In some embodiments, all malicious output detected during the malware scanning may be stored in spoke relational database 426. For example, if any malicious output is detected by the behavioral logging system, the detected malicious output may be stored in spoke relational database 426. In some implementations, malware scanning of the target may be performed according to the malware scan and detection processes and methods disclosed in co-pending, related U.S. patent application Ser. No. 12/982,508).

If, upon visiting the target URL, any significant modifications to the VM are detected (step 660, Yes), worker 422 may cause the VM to revert to a clean state (step 670). Significant modifications to the VM may include loss of communication between or among software architectural elements (e.g., web server 421, worker 422, spoke API 423, malware analyzer 424, repository manager 425, spoke relational database 426, etc.), a number of sites visited by the VM exceeds a predetermined maximum number, the target URL is malicious, etc. After the VM has reverted to a clean state, malware scan of the target may be performed (step 680), as discussed in greater detail above.

Once malware scanning is complete, thick spoke 130 may send the results of the malware scan request to hub 120 which may, in turn, send the results of the malware scan request to malware controller 110 (step 690). When hub 120 receives the results of the malware scan request from thick spoke 130, hub 120 may send an acknowledgement message to thick spoke 130. Similarly, when malware controller 110 receives the results of the malware scan request from hub 120, malware controller 110 may send an acknowledgement message to hub 120.

As discussed above, thin spoke 140 may be configured to operate as a proxy for one or more thick spokes 130. Thus, the steps discussed above that are performed by thick spoke 130 may be routed through thin spoke 140, allowing thin spoke 140 to serve as an intermediary. Routing through thin spoke 140 may be achieved by worker 422 of thick spoke 130. In some embodiments, routing through thin spoke 140 by thick spoke 130 may be instructed by malware controller 110, hub 120, or any combination thereof.

In the disclosed embodiments, web servers attempting to infect computing devices with malware can be identified through IP diversification and improved malware scanning. This can be achieved by using VMs operating on computing devices physically located at an IP address, as well as through the use of proxies.

It is intended, therefore, that the specification and examples be considered as exemplary only, with a true scope and spirit of the disclosure being indicated by the following claims and their full scope of equivalents.

What is claimed is:

1. A computer-implemented method, operating in a hub computing device, for malware scanning and detection, the method comprising:

receiving, by the hub computing device from a separate controller computing device, a malware scan request having:
a first portion that includes an identification of a target website, and
a second portion that includes instructions to scan the target website;

identifying, by the hub computing device, a plurality of first spoke honeypot computing devices for performing the malware scan request on the target website, wherein:

at least one first spoke honeypot computing device of the plurality of first spoke honeypot computing devices is separate from the hub computing device, at least one first spoke honeypot computing device is configured to use a second spoke honeypot computing device as a proxy, and the second spoke honeypot computing device appears to originate from a different address than the plurality of first spoke honeypot computing devices;

sending, by the hub computing device to the plurality of first spoke honeypot computing devices, the malware scan request received from the controller computing device, wherein at least one first spoke honeypot computing device of the plurality of first spoke honeypot computing devices is configured to route the malware scan request to the second spoke honeypot computing device;

receiving, by the hub computing device from at least one first spoke honeypot computing device of the plurality of first spoke honeypot computing devices, a first set of results associated with performing the malware scan request, wherein performing the malware scan request includes visiting the target website by at least one first spoke honeypot computing device of the plurality of first spoke honeypot computing devices or by the second spoke honeypot computing device; and sending, to the controller computing device, the first set of results associated with performing the malware scan request.

2. The computer-implemented method of claim 1, further comprising:
sending, to the controller computing device, an acknowledgement message after receiving the malware scan request.

3. The computer-implemented method of claim 1, further comprising:
sending, to the plurality of first spoke honeypot computing devices, an acknowledgement message after receiving the first set of results associated with the malware scan request.

4. The computer-implemented method of claim 1, wherein identifying the plurality of first spoke honeypot computing devices for performing the malware scan request comprises:
identifying the plurality of first spoke honeypot computing devices for performing the malware scan request based on a workload determination.

5. The computer-implemented method of claim 1, wherein the identification of the target website includes a target universal resource locator (URL).

6. The computer-implemented method of claim 1, wherein the second spoke honeypot computing device is a proxy for the plurality of first spoke honeypot computing devices, and wherein the second spoke honeypot computing device comprises a different internet protocol (IP) address than any first spoke honeypot computing device included in the plurality of first spoke honeypot computing devices.

7. The computer-implemented method of claim 1, wherein the performing the malware scan request comprises identifying obfuscated executable code in network traffic, identifying cross-site scripting attacks, or both.

8. The computer-implemented method of claim 1, wherein the plurality of first spoke honeypot computing devices and the second spoke honeypot computing device are in different netblocks of internet protocol (IP) addresses.

9. A hub computing apparatus for malware scanning and detection, the apparatus comprising:

at least one memory to store data and instructions; and
at least one processor configured to access memory and to execute instructions to:
receive, from a separate controller computing device, a scan request having:
a first portion that includes an identification of a target website, and
a second portion that includes instructions to scan the target website;
identify a plurality of first spoke honeypot computing devices for performing the scan request on the target website, wherein:
at least one first spoke honeypot computing device of the plurality of first spoke honeypot computing devices is separate from the hub computing apparatus,
at least one first spoke honeypot computing device is configured to use a second spoke honeypot computing device as a proxy, and
the second spoke honeypot computing device appears to originate from a different address than the plurality of first spoke honeypot computing devices;
send, to the plurality of first spoke honeypot computing devices, the scan request received from the controller computing device, wherein at least one of the plurality of first spoke honeypot computing devices is configured to route the scan request to the second spoke honeypot computing device;
receive, from at least one of the plurality of first spoke honeypot computing devices, a first set of results associated with performing the scan request, wherein performing the scan request includes visiting the target website by at least one first spoke honeypot computing device of the plurality of first spoke honeypot computing devices or by the second spoke honeypot computing device; and
send, to the controller computing device, the first set of results associated with performing the scan request.

10. The hub computing apparatus of claim 9, wherein the at least one processor is configured to:
send, to the controller computing device, an acknowledgement message after receiving the scan request.

11. The hub computing apparatus of claim 9, wherein the at least one processor is configured to:
send, to the plurality of first spoke honeypot computing devices, an acknowledgement message after receiving the first set of results associated with the scan request.

12. The hub computing apparatus of claim 9, wherein when the at least one processor is configured to identify the plurality of first spoke honeypot computing devices for performing the scan request, the processor is further configured to:
identify the plurality of first spoke honeypot computing devices for performing the scan request based on a workload determination.

13. The hub computing apparatus of claim 9, wherein the identification of the target website includes a uniform resource locater (URL).

14. The hub computing apparatus of claim 9, wherein the scan request is a malware scan request.

15. A computer-implemented method, operating in a plurality of first spoke honeypot computing devices, for malware scanning and detection, the method comprising:
receiving, by the plurality of first spoke honeypot computing devices, from a hub computing device separate from the plurality of first spoke honeypot computing devices, a scan request having:
a first portion that includes an identification of a target website, and
a second portion that includes instructions to scan the target website,
wherein the first spoke honeypot computing device is configured to use a second spoke honeypot computing device as a proxy, and
wherein the second spoke honeypot computing device appears to originate from a different address than the plurality of first spoke honeypot computing devices;
routing the scan request to the second spoke honeypot computing device;
performing, by the first spoke honeypot computing device, analysis of the target website according to the instructions included in the scan request, wherein the analysis of the target website includes visiting the target website by the first spoke honeypot computing device or by the second spoke honeypot computing device;
storing, in a database associated with the plurality of first spoke honeypot computing devices, a first set of results associated with the analysis of the target website; and
sending, by the first spoke honeypot computing device to the hub computing device, the first set of results of the analysis.

16. The computer-implemented method of claim 15, further including:
performing, via a set of one or more virtual machines operating in the plurality of first spoke honeypot computing devices, the analysis according to the instructions included in the scan request, wherein the analysis includes monitoring (API) calls on the set of one or more virtual machines; and
logging the analysis into a first file, wherein the first file includes the first set of results of the analysis of the target website.

17. The computer-implemented method of claim 15, wherein the identification of the target website includes a universal resource locator (URL) of the target website.

18. The computer-implemented method of claim 17, wherein performing the analysis according to the instructions included in the scan request includes:
visiting the target website based on the URL included in the scan request;
observe one or more malicious actions made by the target website; and
performing malware analysis of the target website.

19. The computer-implemented method of claim 15, wherein the scan request is a malware scan request.

20. A plurality of spoke honeypot computing apparatuses for malware scanning and detection, each of the spoke computing apparatuses comprising:
at least one memory to store data and instructions; and
at least one processor configured to access the at least one memory and, when executing the instructions, to:
receive, by a plurality of first spoke honeypot computing apparatuses, from a hub computing device separate from the first spoke honeypot computing apparatus, a scan request having:
a first portion that includes an identification of a target website, and
a second portion that includes instructions to scan the target website,
wherein at least one first spoke honeypot computing apparatus of the plurality of first spoke honeypot computing apparatuses is configured to use a second spoke honeypot computing apparatus as a proxy, and
wherein the second spoke honeypot computing apparatus appears to originate from a different address source than the plurality of first spoke honeypot computing apparatuses;
route the scan request to the second spoke honeypot computing apparatus;
perform analysis of the target website according to the instructions included in the scan request, wherein performing the scan request includes the first spoke honeypot computing apparatus or the second spoke honeypot computing apparatus visiting the target website;
store, in a database associated with the plurality of first spoke honeypot computing apparatus, results of the analysis of the target website; and
send, to the hub computing device, the results of the analysis of the target website.

21. The first spoke honeypot computing apparatus of claim 20, wherein the at least one processor is configured to:
perform, via a virtual machine, the analysis according to the instructions included in the scan request.

22. The first spoke honeypot computing apparatus of claim 20, wherein the identification of the target website includes a universal resource locator (URL) of the target website.

23. The first spoke honeypot computing apparatus of claim 22, wherein when the at least one processor is configured to perform the analysis according to the scan request, the at least one processor is configured to:
perform malware analysis of the target website associated with the URL included in the scan request.

24. The first spoke honeypot computing apparatus of claim 20, wherein the scan request is a malware scan request.

* * * * *